May 29, 1956 F. V. HUNT 2,748,017
PROJECTION SLIDE AND METHOD OF PREPARING THE SAME
Filed May 1, 1953
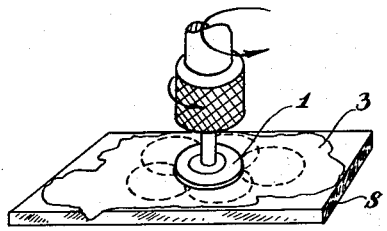
Fig. 1
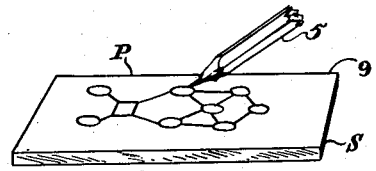
Fig. 2
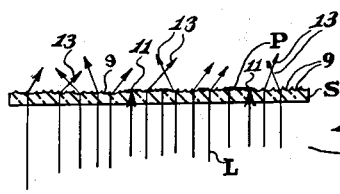
Fig. 3
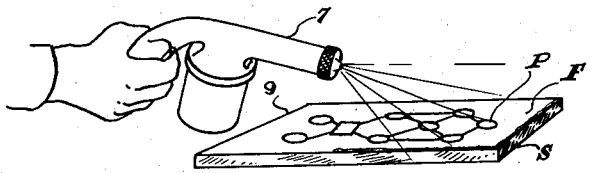
Fig. 4
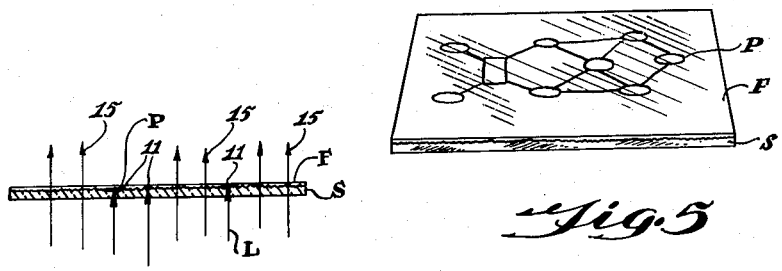
Fig. 5
Fig. 6
INVENTOR.
FREDERICK V. HUNT
BY Rines and Rines
ATTORNEYS

2,748,017

PROJECTION SLIDE AND METHOD OF PREPARING THE SAME

Frederick V. Hunt, Belmont, Mass.

Application May 1, 1953, Serial No. 352,408

2 Claims. (Cl. 117—8)

The present invention relates to lantern slides for projection and to methods of preparing the same.

Lantern slides are customarily prepared by photographic processes requiring specialized equipment and attendant with considerable time consumption. It often is desirable, however, to prepare lantern slides for projection under circumstances that forbid the use of photographic processes. Such circumstances arise, for example, where there may be no access to a dark room, or where the slide must be prepared in a hurry. Attempts have been made, therefore, to produce slides by drawing upon a matte surface and projecting light therethrough. Such slides are unsatisfactory, however, since the matte surface diffuses the light, permitting only a very small light intensity to reach the projection screen, and providing poor contrast in the projected image.

An object of the present invention is to provide a new and improved non-photographic lantern slide for projection.

A further object is to provide a new and improved method of making such a slide.

Still an additional object is to provide a new and improved method of more general utility for rendering optically roughened surfaces transparent.

Other and further objects will be explained hereinafter and will be more particularly pointed out in the appended claims.

The invention will now be described in connection with the accompanying drawings, Figs. 1, 2 and 4 of which are perspective views of successive steps in the preparation of the slide;

Figs. 3 and 6 are end elevations illustrating, respectively, the paths of rays of light passing through the slide before and after the performance of the step illustrated in Fig. 4; and Fig. 5 is a perspective view of the slide.

A surface of a glass or other similar thin transparent sheet S is first provided with a continuous matte surface comprising a large number of very small closely positioned depressions 9. In Fig. 1, this is shown effected by a rotary grinder 1 operating upon an abrasive paste 3, such as a water suspension of fine grit of particle size sufficient to pass through a 400 to 600 mesh-per-inch screen. If desired, two sheets of glass, such as conventional lantern-slide cover glass, may be rubbed together with the abrasive interposed, or any other rubbing surface may be substituted for the grinder 1, to provide the roughened surface. The grinding is preferably continued until the surface of the sheet S assumes a fine, frosted, translucent appearance. The surface 9 may also be obtained in other ways, as by etching.

Any desired marking or drawing, hereinafter referred to as the pattern P containing the intelligence to be projected, may be applied to the roughened surface 9 as by a graphite pencil, such as of the "lead" pencil variety, or a crayon 5. The graphite, crayon or other partially or substantially completely opaque material, hereinafter referred to in the specification and in the appended claims as a "substantially light-opaque substance" becomes thus deposited in depressions of the predetermined portions P of the surface 9 where the pattern has been applied. If parallel rays of light L, Fig. 3, are passed through the sheet S, those rays that reach the depressions within which the graphite, crayon or other substantially opaque material has been deposited, will be stopped, as at 11, to a degree dependent upon the degree of opacity of the material. Those rays that pass through the remaining depressions 9, however, will become laterally diffused or scattered in all directions, as indicated at 13. It is for this reason that a slide prepared by writing upon a matte surface produces but low light intensity, of the order of but ten to fifteen percent only of the light transmitted in the absence of the slide, and poor image contrast upon a projection screen, as before stated.

In accordance with the present invention, however, the transparency of the original transparent sheet S is then restored to the optically rough surface 9 by coating the surface with a light-transparent plastic filler in order to fill the remaining depressions 9 unfilled by the opaque material P. The plastic filler is shown being sprayed as a film F upon the surface 9 in Fig. 4, but it may be applied, also, by brushing, or by an eye-dropper, the end of which may be used as an applicator to spread the filler film over the sheet S to the edges thereof, or by any other desired apparatus or technique. The filler is preferably a rapidly drying film-forming substance such as a dilute solution of cellulose nitrate, vinylite, krylon, silicone resin in a suitable solvent, or emulsions or dispersions in water of polyvinyl plastics. The surface of the film F may be rendered flat by applying the filler rapidly over the complete surface 9 before it has had a chance to dry at any one point and resting the slide upon a flat surface to dry. The use of the beforementioned water dispersions of plastic material is especially helpful for the purpose of avoiding haziness in the dried film, commonly referred to as "blushing" in the spraying art.

It has been found, furthermore, that since only a very thin plastic film F is required in order to fill in the light-diffusing-and-scattering irregularities of the surface 9, it is not necessary that the index of refraction of the plastic film correspond to that of the sheet S. For thicker films, such correspondence, however, is desirable.

The light-diffusing-and-scattering irregularities or depressions of the optically rough surface 9 are thus filled in and effectively removed, and the parallel rays of light L pass through sheet S and its film F, except at the portions where the opaque markings P have been applied, as parallel rays 15, Fig. 6, providing substantially the same high light transmission as the original sheet S, usually of the order of about 75 to 85 percent transmission, and providing, also, a high degree of contrast in the projected image. The film F, furthermore, if thick enough, provides a protective coating for the markings P, protecting the same against abrasion.

If a colored crayon 5 is employed to deposit substantially light-opaque substance in the shape of the pattern P, some light, as before stated, may be partially transmitted therethrough with color selectivity. In all cases, however, a high degree of optical contrast in the projected image may be obtained.

Through the sheet S was previously described as of glass, and is preferably such, it may be of plastic material such as vinylite about 25 to 50 mils in thickness. It may be observed, in addition, that by the above-described technique, materials easily carried in the brief case of a lecturer will enable the simple and rapid production of a projection slide.

While the invention, furthermore, has been described in connection with its preferred application to projection slides, it is to be understood that it is of more general utility as well, being applicable to the rendering optically transparent of any intentionally or accidentally marred or otherwise optically roughened surface.

Further modifications will occur to those skilled in the art and all such are considered to fall within the spirit and scope of the invention as defined in the appended claims.

What is claimed is:

1. A projection slide having a pattern containing intelligence to be projected comprising a sheet of light-transparent material a continuous surface of which is optically roughened throughout to provide the continuous surface with a matte constituted of very small closely positioned light-scattering and light-diffusing depressions, the matte having a portion in the shape of the pattern in the depressions of which there is deposited a substantially light-opaque substance for rendering the said portion of the matte substantially opaque, and the depressions in the non-pattern-shaped portion of the matte containing a light-transparent filler that renders the sheet light-transparent through the non-pattern-shaped portion.

2. A method of making a projection slide that comprises optically roughening a continuous surface of a sheet of light-transparent material throughout to provide the continuous surface with a matte constituted of very small closely positioned light-scattering and light-diffusing depressions, depositing a substantially light-opaque substance in the depressions of a portion of the matte in the shape of a pattern containing intelligence to be projected to render the said portion of the matte substantially light-opaque, and filling the depressions in the non-pattern-shaped portion of the matte with a light-transparent filler to render the sheet light-transparent through the non-pattern-shaped portion.

References Cited in the file of this patent

UNITED STATES PATENTS

| | | |
|---|---|---|
| 1,044,135 | Buechner | Nov. 12, 1912 |
| 1,157,569 | Moench | Oct. 19, 1915 |
| 1,267,014 | Tillyer | May 21, 1918 |
| 1,494,630 | Reizenstein | May 20, 1924 |
| 2,016,593 | Cleveland | Oct. 8, 1935 |
| 2,034,308 | Morgan | Mar. 17, 1936 |
| 2,062,865 | Cleveland | Dec. 1, 1936 |
| 2,234,237 | Feist | Mar. 11, 1941 |
| 2,345,942 | Lehman | Apr. 4, 1944 |
| 2,472,128 | Staehle | June 7, 1949 |